R. STUCKWISCH.
DUMP WAGON.
APPLICATION FILED JUNE 10, 1909.

986,604.

Patented Mar. 14, 1911.

WITNESSES:
O. M. McLaughlin
G. H. Boink

INVENTOR.
Rudolph Stuckwisch.
BY
T. H. Lockwood
ATTORNEY.

UNITED STATES PATENT OFFICE.

RUDOLPH STUCKWISCH, OF INDIANAPOLIS, INDIANA.

DUMP-WAGON.

986,604. Specification of Letters Patent. Patented Mar. 14, 1911.

Application filed June 10, 1909. Serial No. 501,440.

*To all whom it may concern:*

Be it known that I, RUDOLPH STUCKWISCH, of Indianapolis, county of Marion, and State of Indiana, have invented a certain new and useful Dump-Wagon; and I do hereby declare that the following is a full, clear, and exact description thereof, reference being had to the accompanying drawings, in which like numerals refer to like parts.

The object of this invention is to provide a dump wagon which is capable of being operated and controlled by the team.

The chief feature of the invention consists in pivotally mounting the wagon bed on means mounted on the front and rear axles so that said bed mounting means may double or fold up to some extent when the team backs, or for any other reason the axles approach each other.

The nature of the invention will be understood from the accompanying drawings and the following description and claims.

Figure 1:
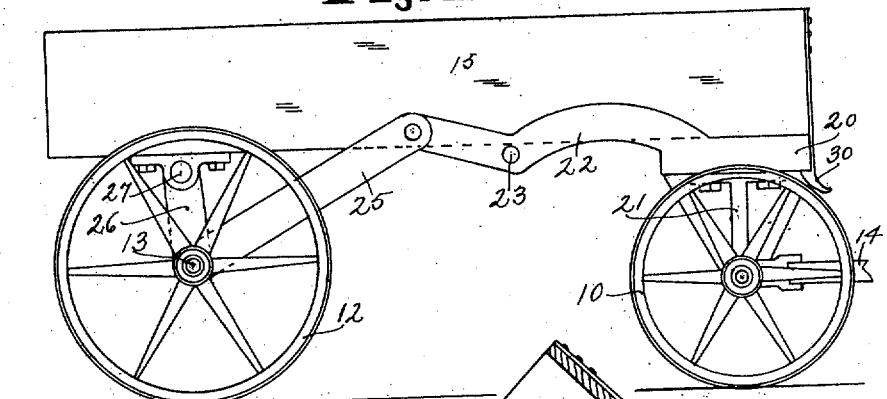
Figure 2:
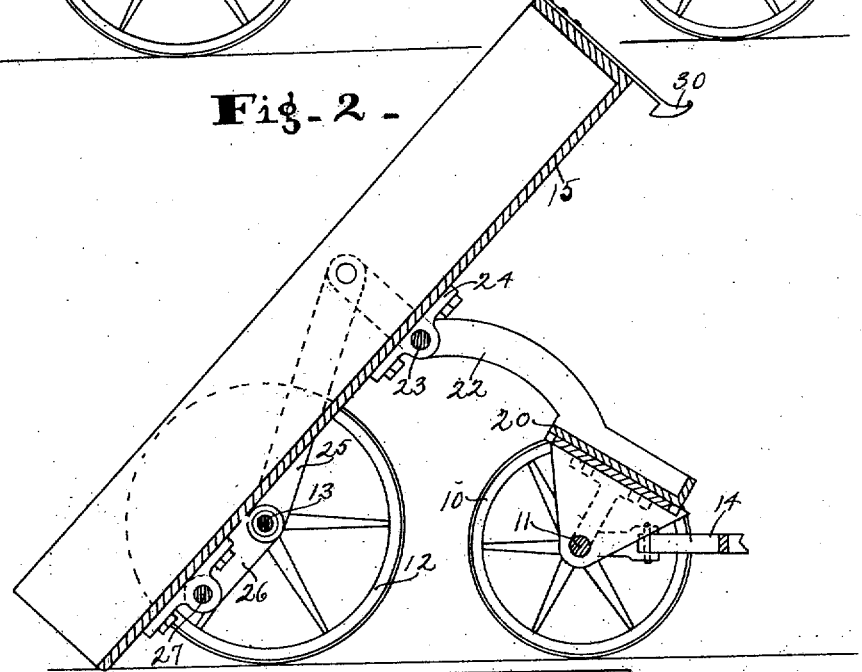
Figure 3:
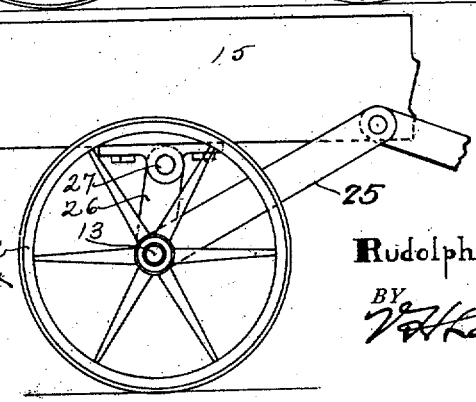

In the drawings Figure 1 is a side elevation of the dump wagon in its normal position. Fig. 2 is a vertical central section thereof in a dumping position. Fig. 3 is a side elevation of the rear half of the wagon, showing a modified form.

The wagon shown has front wheels 10 on the front axle 11 and rear wheels 12 on the rear axle 13 and a tongue 14 and bed 15. The forward portion of the bed is supported on a forward frame consisting of a substantially horizonal forward portion 20 with rearwardly extending side bars 22 and with a downwardly extending portion 21 which is mounted on the front axle so as to rock or turn thereon while dumping. Side bars 22 extend beside the bed and assist in holding the bed in place, it being located between said bars and is pivoted to said bars between their ends by the rod 23 which is mounted under the bed in the bearings 24. Hence the rear ends of the bars 22 extend some distance to the rear of the fulcrum rod 23, and as here shown, at a slight upward inclination. The rear end of the bed is supported by upright arms 26 which are pivoted to the rear axle and also to brackets 27 secured to the bottom of the bed. Rear side bars 25 are pivotally connected at one end to the rear axle and at the forward end to the rear ends of the side bars 22, and in that way the two axles are hitched together, the side bars 22 and 25 being adapted to fold toward each other like a jack-knife, as shown in Fig. 2.

The rear upright arms 26 need not necessarily be vertical normally, and their normal position is determined by the length of the side bars 25 or the side bars 22, or the position of the brackets 27 on the bed, said side bars or the position of said brackets 27 determining the normal distance between the two axles. Hence in Fig. 1 the upright arms 26 are inclined slightly with their upper ends to the rear of a vertical line through the axle, while in Fig. 3 the arm 26 assumes normally an opposite inclination. A beveled spring catch 30 is mounted at the forward end of the wagon to engage the forward edge of the horizontal portion 20 of the forward frame and prevent the wagon from dumping when not desired. When the rear upright arms 26 are in the position shown in Fig. 3, said catch 30 may not be necessary but it is preferable, as even then, while traveling over rough roads, or for any other accidental cause the axles might be moved closer to each other than normally and accidentally cause the dumping when not desired.

The dumping is caused by moving the forward and rear axles toward each other by any means. This is, however preferably done by backing the team, after releasing the catch 30, when such catch is provided on the wagon. Such movement of the axles will cause the bed to tilt, the upper ends of the arms 26 moving rearwardly and then gravity of the rear part of the load will tend to push the rear wheels forwardly or throw the wagon bed rearwardly, or do both, and this may occur simultaneously with the backing movement of the team. In any event and from any of said causes the rear end of the bed will turn downwardly, the forward end move upwardly and the bed assume an inclined dumping position, as shown in Fig. 2. After the load is dumped the forward pull of the team will return all parts to their normal condition.

What I claim as my invention and desire to secure by Letters Patent is:

1. A dump wagon including a rigid bed, wheel supported front and rear axles, upwardly extending supports for the rear end of the bed, means for supporting the front end of the bed on the front axle, forward bars rigidly connected with the front support and extending rearwardly and pivotally connected with the wagon bed between their ends, and rear bars mounted in connection with the rear axle and extending forwardly and pivoted to the rear ends of said forward bars.

2. A dump wagon including a rigid bed, wheel supported front and rear axles, upwardly extending supports for the rear end of the bed which are pivoted to both the bed and the rear axle, means for pivotally supporting the front end of the bed on the front axle, forward bars rigidly connected with the front support and extending rearwardly and pivotally in connection with the wagon bed between their ends, and rear bars mounted in connection with the rear axle and extending forwardly and pivoted to the rear ends of said forward bars.

3. A dump wagon including a wagon bed, front and rear wheel supported axles, a frame for supporting the forward portion of the wagon bed which consists of a substantially vertical portion mounted on the front axle and a substantially horizontal portion rigidly secured on the upper end of said vertical portion and pivotally connected with the wagon bed toward the rear end of said horizontal portion and having on each side of the wagon bed a rearwardly extending arm, bars pivotally connected with the rear ends of said arms and to the rear axle, and upwardly extending supports for the rear part of the wagon bed which are pivotally connected at their lower ends to the rear axle and at their upper ends to the wagon bed, the parts being arranged so that when the forward axle moves rearwardly the arms at the rear end of said forward frame will draw the rear axle forwardly and cause the wagon to dump.

In witness whereof, I have hereunto affixed my signature in the presence of the witnesses herein named.

RUDOLPH STUCKWISCH.

Witnesses:
G. H. BOINK,
O. M. McLAUGHLIN.

Copies of this patent may be obtained for five cents each, by addressing the "Commissioner of Patents, Washington, D. C."